United States Patent [19]

Umehara

[11] Patent Number: 4,770,447
[45] Date of Patent: Sep. 13, 1988

[54] APPARATUS FOR JOINING A THIN METAL PIPE TO A FLANGE JOINT

[75] Inventor: Kazumasa Umehara, Shizuoka, Japan

[73] Assignee: Usui Kokusai Sangyo Kabushiki Kaisha, Nagasawa, Japan

[21] Appl. No.: 99,409

[22] Filed: Sep. 21, 1987

[30] Foreign Application Priority Data

Sep. 25, 1986 [JP] Japan .................. 61-146262

[51] Int. Cl.⁴ .................................... F16L 41/00
[52] U.S. Cl. .................. 285/189; 285/382.5; 285/405
[58] Field of Search .............. 285/382.5, 382.4, 222, 285/189, 405, 208, 206, 158

[56] References Cited

U.S. PATENT DOCUMENTS

| | | | |
|---|---|---|---|
| 2,485,960 | 10/1949 | Donahue | 285/382.5 |
| 2,551,871 | 5/1951 | Briggs, Jr. | 285/382.5 X |
| 2,557,930 | 6/1951 | Bard | 285/382.5 X |
| 3,512,808 | 5/1970 | Graham | 285/189 |
| 3,778,090 | 12/1973 | Tobin | 285/382.5 X |
| 3,787,945 | 1/1974 | Pasek et al. | 285/222 X |
| 4,142,843 | 3/1979 | Kish | 285/382.4 X |

Primary Examiner—Thomas F. Callaghan
Attorney, Agent, or Firm—Anthony J. Casella; Gerald E. Hespos

[57] ABSTRACT

An apparatus for joining an end of a thin metal pipe to a flange joint is disclosed. The apparatus has a flange member fastened to a base and a pipe. The flange member includes an assembly hole axially formed and an open wall constituting a hole peripheral wall. The pipe includes a collar-like protrudent wall and an expanded diameter wall which cooperate to seize the hole peripheral wall. The pipe is made coaxial with the hole formed in the base. A sealing is additionally provided between the hole of the base and the expanded diameter wall.

1 Claim, 1 Drawing Sheet

PRIOR ART

APPARATUS FOR JOINING A THIN METAL PIPE TO A FLANGE JOINT

BACKGROUND OF THE INVENTION

1. Field of the Invention

The present invention relates to the improvement of an apparatus for joining an end of a thin metal pipe to a flange joint, this type of pipe having a relatively small diameter, i.e., 50 m/m in pipe diameter and approximately 2 m/m or less in wall thickness and being widely utilized for arrangement of passageways for supplying the air and oil to an automobile, a variety of machines, equipments and devices.

2. Description of the Prior Art

This kind of conventional joining apparatus is constructed in such a way that: an end of a metal pipe (P') is at first inserted into an assembly hole (12) perforated in the axial core portion of a flange member (11) so as to be welded to each other by heat-brazing (W); a communication hole (15) formed in a corresponding installation base (13) is next made coaxial with the metal pipe (P') in order to fasten the flange joint to the base (13) with a bolt; and a sealing (14) is interposed between the outer periphery of the metal pipe (P') and the inner periphery of the comminication hole (15).

However, the following problems inherent in the conventional structure arise. There is created deterioration in mechanical strength which lies in fragility caused by the local heating in the vicinity of the brazing-welded portion of the pipe (P') because of a remarkable difference in wall thickness between the pipe (P') and the flange member (11), the local heating being derived from unaccustomed and inexperienced operations when performing the welding process based on heat-brazing with a burner or the like. This induces a crack and breakdown in the vicinity of the brazing-welded portion (W) of the pipe (P') due to such factors as uneveness in product bending configuration of the pipe (P') and the arrangement under an exciting condition caused by forcible installation relative to the discordance. Since the joining process is based on the brazing-weld, in some cases the soder is dropped and stuck to the installation surface of the flange member (11), and it is unfeasible to employ the flange member 11) and the pipe (P') which have previously been subjected to anticorrosive coating process by plating. Hence, there is no alternative but to effect the coating process after the brazing-weld (W) has been finished. This requires troublesome treatment, which will further bring about a decrease in effeciency of processing.

SUMMARY OF THE INVENTION

It is a primary object of the present invention which obviates tha above-described problems in a highly effective manner to provide a joining apparatus arranged such that: a hole peripheral portion, disposed on the side of an installation surface, of an assembly hole formed in a flange member fastened to an installation base serves as a tapered open wall constituting a hole peripheral wall; an hole peripheral wall portion including the open wall of the assembly hole is fixedly seized by a collar-like protrudent wall provided on the pipe and by an expanded diameter wall which is so formed at the tip of the pipe as to expand in diameter within the assembly hole; and the pipe is made coaxial with a communication hole, the joining apparatus having characteristics wherein no joining means based on heat-brazing weld is required, this eliminating such defects as a crack and breakdown in the vicinity of a fixedly inserted portion of the pipe which are attributed to deterioration in mechanical strength as well as a drop of solder onto the installation surface of the flange member, and the flange member and the pipe that have previously subjected to anticorrosive coating process by plating or the like, which leads to improvement in efficiency of processing.

To this end, according to one aspect of the invention, there is provided an apparatus for joining an end of a thin metal pipe to a flange joint which is further arranged such that: the hole peripheral portion, disposrd on the side of the installation surface, of the hole peripheral surface serves as the tapered open wall constituting the hole peripheral wall along the hole peripheral surface of the assembly hole perforated in an axial core portion; the collar-like protrudent wall of the pipe which extends outwards and includes an original diameter wall provided at the tip thereof is fitted to a protion in close proximity to the hole periphery on the underside of the assembly hole formed in the tabular flange member fastened to the installation base, in which state the original diameter wall is fixedly inserted and expands in diameter within the assembly hole; the hole peripheral wall portion including the open wall of the assembly hole is fixedly seized by the protrudent wall and the expanded diameter wall contiguously facing the open wall; and the pipe is made coaxial with the communication hole formed in the installation base.

BRIEF DESCRIPTION OF THE DRAWINGS

Other objects and features of the invention will become apparent from the following description of embodiments with reference to the accompanying drawings in which.

DETAILED DESCRIPTION OF THE PREFERRED EMBODIMENTS

Figure 1:
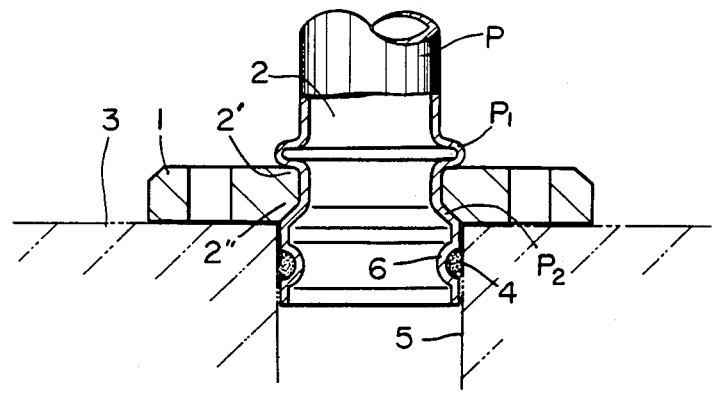
FIG. 1 is a partially cut-away sectional view illustrating a state where an apparatus for joining an end of a thin metal pipe to a flange joint is installed, and showing one embodiment of the present ivvention.
Figure 2:
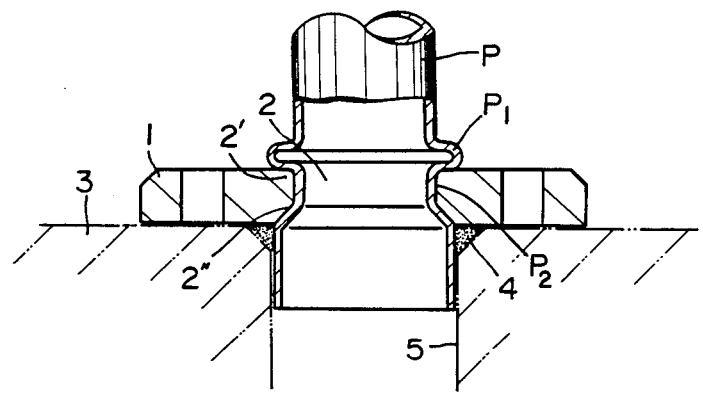
FIG. 2 is a view similar to FIG. 1, showing another embodiment of the present invention.
Figure 3:
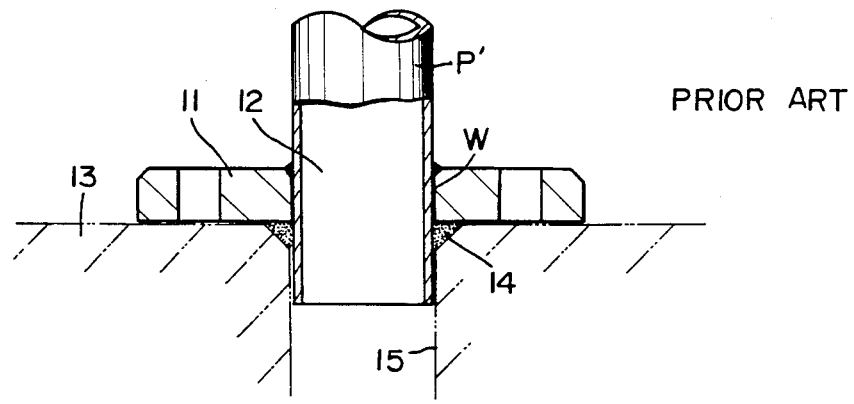
FIG. 3 is a partially cut-away sectional view illustrating a state where a conventional apparatus is installed.

A tabular flange member generally designated (1) is arranged in such a way that a hole peripheral portion of a hole peripheral installation surface is formed to serve as a tapered open wall (2") constituting a hole peripheral wall (2') along the hole peripheral surface of an assembly hole perforated in an axial core portion. The flange member 1 is fastened to a corresponding installation base (3) with a bolt. At this time, the arrangement is so made as to communicate the assembly hole (2) with a communication hole (5) formed in the base (3). The reference symbol (P) denotes a pipe including an original diameter wall provided at its tip and a collar-like protrudent wall (P₁) which extends outwards. The protrudent wall is fitted to the portion in close proximity to the hole periphery on the uderside of the assembly hole (2), in which state the original diameter wall is arranged to expand in diameter within the assembly hole. Subsequently, the hole peripheral wall (2) including the open wall (2") of the assembly hole (2) is fixedly seized by the protrudent wall (p₁) and an expanded diameter wall (P₂) contiguously facing the open wall (2").

According to the present invention, the hole peripheral wall (2') including the open wall (2") of the assembly hole (2) is fixedly seized by the protrudent wall ($P_1$) of the pipe (P) and the expanded diameter wall ($P_2$). This arrangement involves a prerequisite step wherein the original diameter wall on the side of the tip is made to expand in diameter after fixedly inserting the pipe (P). The flanged member (1) is fastened to the installation base (3) so that the pipe (P) is coaxial with the communication hole (5) formed in the base (3).

A sealing generally designated (4) is interposed between the outer periphery of the expanded diameter wall ($P_2$) of the pipe (P) and the inner periphery of the communication hole (5) formed in the base (3), and preferably the sealing (4) is fitted in an annular recessed groove (6) which is, as illustrated in FIG. 1, chased in the outer periphery of the expanded diameter wall ($P_2$).

As is obvious from the description given above, in the higly useful apparatus for joining the end of the thin metal pipe to the flange joint according to the present invention, the junction with a fixedly seizing structure is accomplished by dint of the expansion in diameter within the assembly hole (2). As a result, it is possible to eliminate such defects as a crack and breakdown in the vicinity of the fixedly inserted portion of the pipe which are attributed to deterioration in mechanial strength as well as a drop of solder onto the installation surface of the flange member (1). This advantage is owing to the fact that joining means based on the heat-brazing weld is not required at all. Furthermore, it is feasible to employ the flange member (1) and the pipe (P) which has previously subjected to the anticorrosive coating process by plating or the like and to extremely improve the efficiency in processing.

As many apparently widely different embodiments of this invention may be made without departing from the spirit and scope thereof, it is to be understood that the invention is not limited to the specific embodiments thereof except as defined in the appended claims.

What is claimed is:

1. An apparatus for joining an end opf a thin metal pipe to a flange joint, comprising:

an installation base having a hole extending therein;

a flange member having a top side and an opposed underside and an assembly hole extending therebetween, the assembly hole in said flange member being of smaller cross section than the hole in said installation base, said flange member being fastened to said installation base with the underside thereof being in face-to-face contact with the installation base and with the assembly hole being generally concentric with the hole in the installation base, said flange member defining a tapered open wall extending between said assembly hole and said underside, with the portion of said tapered wall adjacent said underside of said flange generally conforming to the cross-sectional size and shape of the hole in said installation base;

a pipe having one end thereof extending through the assembly hole in said flange member and into the hole in said installation base, said pipe having a cross section substantially conforming to the cross section of said assembly hole, said pipe being formed to define a collar-like protrudent wall extending outwardly and in contacting engagement with the top side of said flange member, said pipe further comprising an expanded wall portion adjacent the end thereof, said expanded wall portion including a tapered wall securely engaging the tapered open wall of said flange and a generally cylindrical wall portion engaging the hole in said installation base, said generally cylindrical portion of the expanded wall being characterized by an inwardly directed annular groove; and a generally annular sealing member engaged in said groove and disposed intermediate said groove of said pipe and the aperture in said installation base.

* * * * *